Apr. 24, 1923.
J. A. HEYSER
BRAKE
Filed Feb. 3, 1921
1,452,736
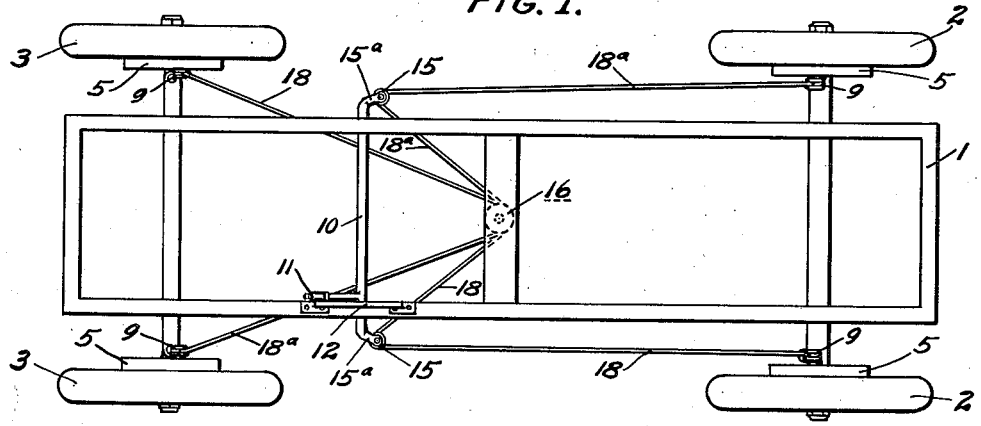
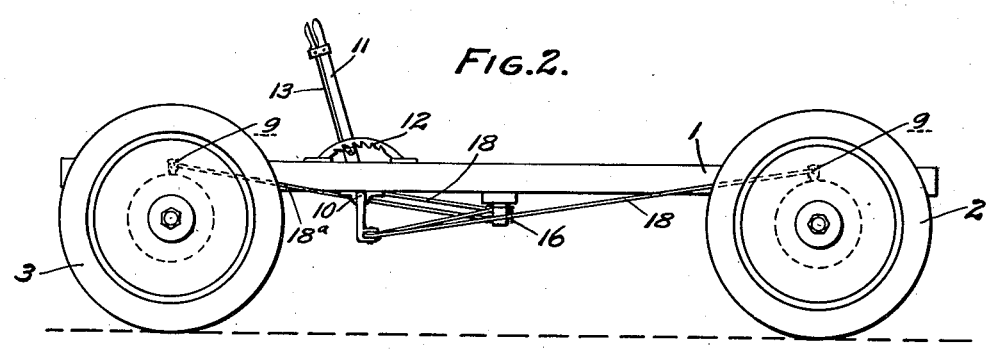
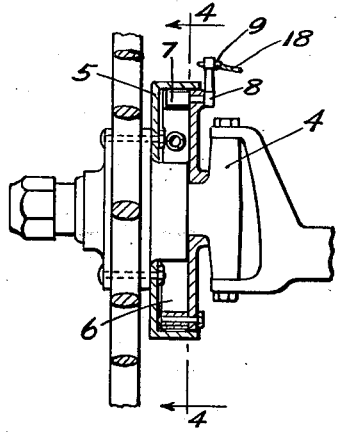
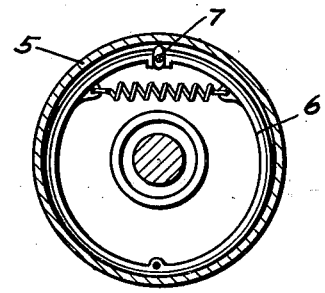
INVENTOR.
JOHN A. HEYSER
BY
ATTORNEYS.

Patented Apr. 24, 1923.

1,452,736

UNITED STATES PATENT OFFICE.

JOHN A. HEYSER, OF LOS ANGELES, CALIFORNIA.

BRAKE.

Application filed February 3, 1921. Serial No. 442,233.

*To all whom it may concern:*

Be it known that I, JOHN A. HEYSER, a citizen of the United States, residing at Los Angeles, in the county of Los Angeles and State of California, have invented new and useful Improvements in Brakes, of which the following is a specification.

It is the object of this invention to provide a brake mechanism for a vehicle, preferably a motor vehicle. The brake mechanism includes brakes for both the rear driving wheels of the motor vehicle and the front steering wheels of the same.

It is the specific object of the invention to provide for operating both the front and rear brakes from a common brake shaft which may be controlled by either a foot pedal or a hand lever. The operating connection for the brakes is so arranged as to provide for actuating the brake bands of the brakes upon the front steering wheels irrespective of the position to which said wheels have been turned, and the operating connections for the brakes are preferably also so arranged as to provide positive operating connections between the respective front wheel brakes and the rear wheel brakes at opposite sides of the vehicle. By this arrangement the application of the brakes is equalized and the operating connections are so arranged that the brakes will not be applied until the brake shaft is actuated, even though the front wheels be turned to their limit of pivotal movement for steering the vehicle.

The invention will be readily understood from the following description of the accompanying drawings, in which Figure 1 is a plan view of a motor vehicle having brakes upon both the front and rear wheels, with the improved operating connections between said brakes.

Fig. 2 is a side elevation of the motor vehicle.

Fig. 3 is a detail section through one of the front steering wheels, and the brake mechanism for the same.

Fig. 4 is a transverse section on the line 4—4 of Fig. 3.

The motor vehicle to which I have shown the improved brake mechanism applied is of the usual construction, including frame 1 having rear drive wheels 2 and front steering wheels 3 supported by usual steering knuckles 4. Usual brake drums and co-operating brake bands are mounted upon both the front and rear wheels, the brake drums being shown at 5 and the brake bands being shown at 6, adapted to be expanded in usual manner through rotation of cams 7 having operating shafts 8 and links 9 connected thereto.

The brakes upon both the front and rear wheels are operated by a brake shaft 10 journaled transversely of the vehicle frame 1 and adapted to be manually rocked in usual manner. The brake shaft may be provided with a foot pedal control or other means, and in the embodiment of the invention as illustrated I have shown the brake shaft as having a hand lever 11, movable in usual manner with relation with an arcuate rack 12 adapted to be engaged by a locking rod 13 carried by the brake lever.

The operating connections provided between links 9 of the respective brakes and the brake shaft 10 including arms 15$^a$ depending from the respective ends of the brake shaft, pulleys 15 upon the respective arms 15$^a$, and a double pulley 16 journaled upon the vehicle frame in rear of the brake shaft 10.

The links 9 for operating the brakes upon the respective front wheels 3 are connected by flexible members 18 and 18$^a$ to the links 9 of the brakes upon the rear wheels 2 at opposite sides of the vehicle, so that the application of the brakes is equalized by positively applying front and rear wheel brakes at opposite sides of the vehicle. As an instance of this arrangement the flexible members 18 are shown extending from the respective links 9 of the front wheel brakes around pulley 16, and thence around pulleys 15 at the ends of brake shaft 10, which are at opposite sides of the vehicle. The flexible members then extend to the links 9 of the rear wheel brakes at the same side of the vehicle as the pulleys 15 over which the flexible members are received.

By this arrangement it will be seen that rocking of brake shaft 10 will actuate the respective brakes, but that by the provision of sufficient slack in flexible members 18 and 18$^a$ the wheels of the vehicle may be turned sufficiently to cause proper steering without tightening the flexible members and thereby applying the brakes. It will also be noted that the means for dependently applying the front and rear wheel brakes at diagonally opposite sides of the vehicle will equalize the application of the brakes.

Various changes may be made without departing from the spirit of the invention as claimed.

What is claimed is:

1. The combination with a vehicle having front and rear wheels, of brakes upon the respective wheels, a brake shaft, flexible operating connections between said brakes and shaft, central guide pulleys for said connections, and lateral pulleys for each connection.

2. The combination with a vehicle having pivotally mounted steering wheels, of brakes upon said wheels, a brake shaft having crank arms, central pulleys, pulleys on said crank arms and flexible operating connections extending from the respective brakes around said central pulleys and to said brake shaft arms at the opposite sides of the vehicle.

3. The combination with a vehicle having front and rear wheels, of brakes upon the respective wheels, a brake shaft, central pulleys, side pulleys on said brake shaft set in advance of the central pulleys, and flexible operating connections extending from the respective front wheel brakes around said central pulleys and thence forwardly to the side pulleys on said brake shaft at the opposite sides of the vehicle and thence to the rear wheel brakes at the same sides of the vehicle as said respective side pulleys.

In testimony whereof I have signed my name to this specification.

JOHN A. HEYSER.